NAVIGATIONAL COMPUTER

Filed Nov. 21, 1945 2 Sheets-Sheet 1

Inventor
MILLARD C. THRASH
By M. C. Hayes
Attorney

Oct. 2, 1951 M. C. THRASH 2,569,505

NAVIGATIONAL COMPUTER

Filed Nov. 21, 1945 2 Sheets-Sheet 2

INVENTOR.
MILLARD C. THRASH,
BY F. J. Schmitt
Walter S. Paul
attorney

Patented Oct. 2, 1951

2,569,505

UNITED STATES PATENT OFFICE 2,569,505

NAVIGATIONAL COMPUTER

Millard C. Thrash, United States Navy

Application November 21, 1945, Serial No. 630,109

8 Claims. (Cl. 235—61)

(Granted under the act of March 3, 1883, as amended April 30, 1928; 370 O. G. 757)

This invention deals with navigational computers for use by aircraft pilots, whereby various navigational problems may be solved by a device requiring the use of only one hand. The computers are made small enough that they may be carried in the pocket, and will accommodate the ordinary 8 inch square photographs, grids and target maps prepared by the Navy or may be made even smaller, if desired, for easier handling.

The object of the present invention is to construct a navigational computer utilizing features of a conventional computer, but having additional advantageous features, whereby navigation problems may be solved without requiring any special knowledge of navigation.

Another object is to construct a navigational computer whereby most navigational problems may be quickly solved by manipulation with one hand only.

Another object is to construct a navigational computer for quickly solving for the correction in compass heading required to make good a predetermined track in accordance with the wind encountered and for determining the ground speed or for maintaining a desired bearing on a moving object such as a ship, or other aircraft, as well as other pertinent data.

Another object is to construct a navigational computer including means for determining compass heading correction, track, ground speed, range, etc. and requiring the use of one hand only.

Other and more specific objects will become apparent in the following detailed description of two forms of computers constructed in accordance with the present invention, having reference to the accompanying drawings, wherein.

Figure 1:
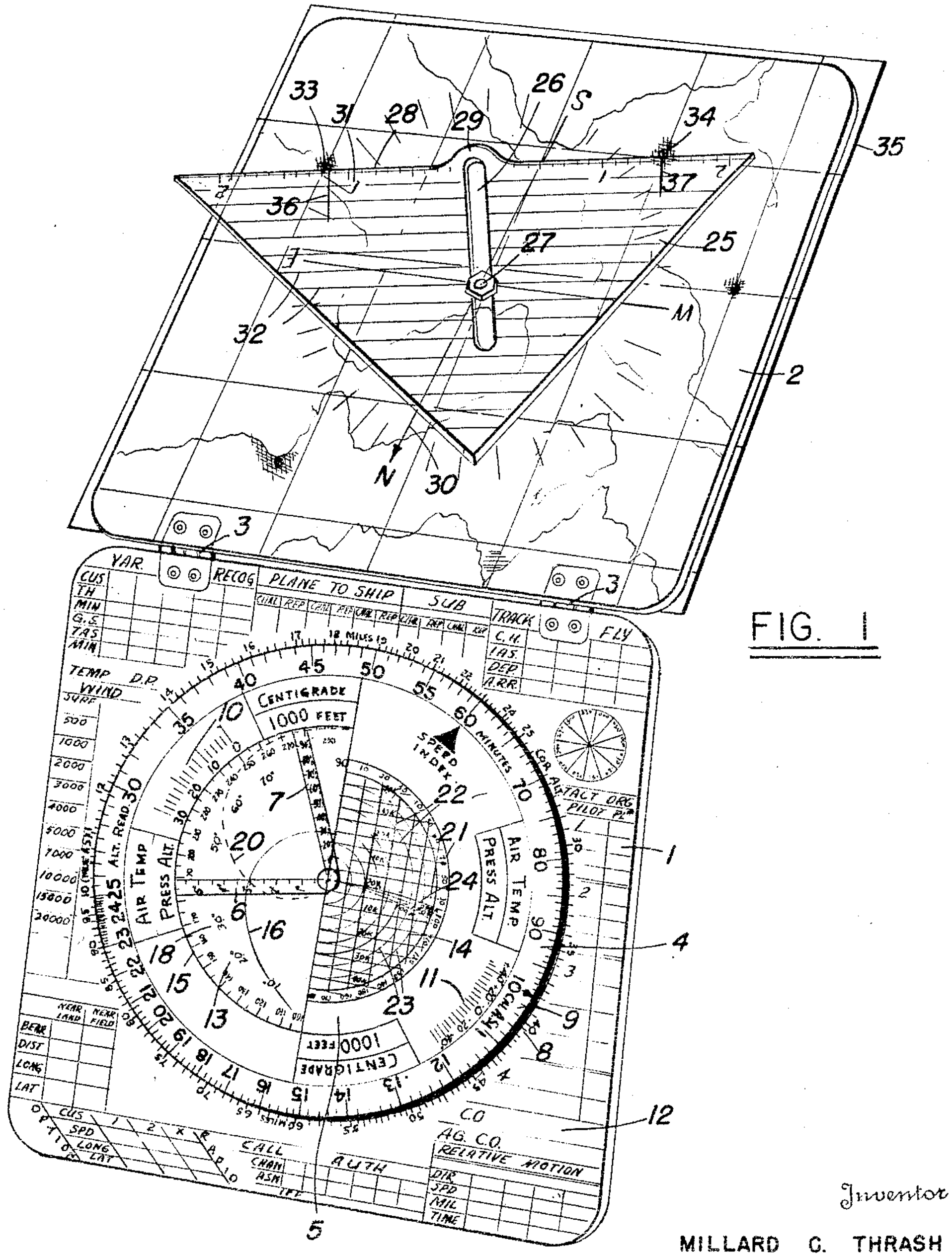
Fig. 1 is a perspective view of one form of the present invention made of Plexiglas squares hinged together.
Figure 2:
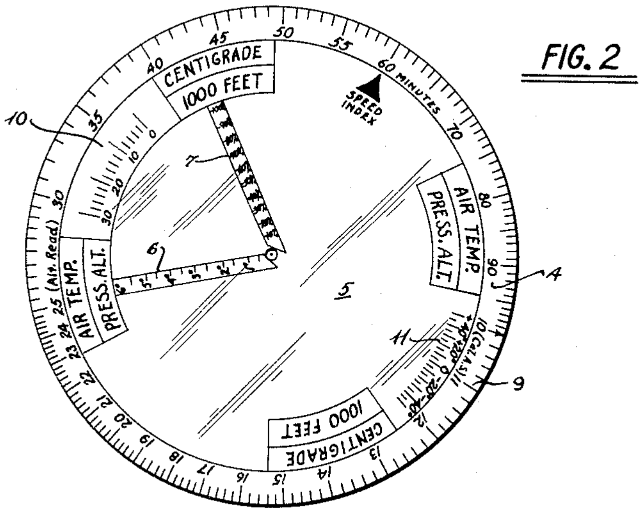
Fig. 2 is a front row of the rotatable disc element of Fig. 1 showing the scales formed thereon.
Figure 3:
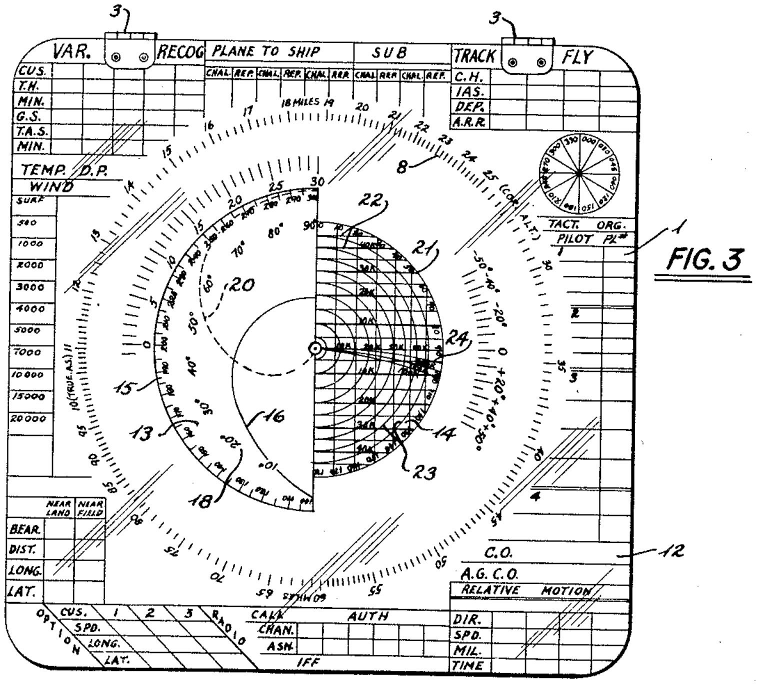
Fig. 3 is a front view of the lower square Plexiglas sheet of Fig. 1 with the rotatable disc removed, and showing the scales formed thereon.

Referring to the form of the device shown in Fig. 1, this computer is intended for quick single-handed operation, with a minimum of distraction from the pilot's other duties. In addition to retaining the features of conventional computers, it provides means for determining the drift correction for any air speed from 100 to 300 knots and wind of any force and direction, and for determining ground speeds for any air speed and for any wind up to 50 knots.

This computer comprises two square Plexiglas sheets 1 and 2 about eight inches square, hinged at 3, 3, each other along one edge. One of these squares 1 has rotatably mounted on it, a Plexiglas disc 4 having a clear circular window 5 in its center on which are marked off two radial straight-edged scales 6 and 7 for use in connection with the markings on the square sheet underneath the window. The disc has a slide rule logarithmic at the circumference thereof and a pair of temperature and altitude correction scales 10 and 11 spaced inwardly from the circumference of the disc for correcting the altitude and air speed readings. Sheet 1 has a logarithmic scale 8 surrounding scale 9 on disc 4.

The surface 12 in the margin of the sheet around the outside of the slide rule scale is sanded, and is marked off with tables wherein various data may be entered during flight to assist the pilot in making a more complete and accurate report when he returns to his base. One illustrative arrangement of such tables which may be very useful is shown in the drawing. However, this may be varied to suit requirements.

The sheet 1 has marked on it two semicircular charts 13 and 14 under the clear window 5 of the disc 4. The chart 13 under the left half of the window comprises a circumferential scale 15 of air speeds from 100 to 300 knots and a curve 16 indicating the correction for a 10 knot wind relative 90° to the track, when read on the straight-edge 6 scaled off in degrees from zero to 6° on the disc when said straight-edge 6 is lined up with the proper air speed on the circumferential scale 15. It also has another circumferential scale 18 from zero to 90° and another curve 20 which indicates the relative wind correction in per cent of the 90° wind correction, when the relative direction of wind is other than 90°, by reading the value on the scale of the other straight-edge 7 on the disc when this straight-edge 7 is lined up with the relative direction of wind in degrees on the circumferential scale 18.

The other half of the space under the clear window 5 of the disc 4 is marked off as a chart for determining the ground speed, and comprises a circumferential scale 21 from zero to 180°, a series of grid lines 22, the vertical lines joining the 10° intervals on the upper and lower quarters of the circumference, the horizontal lines spaced evenly from the center to indicate wind speed in increments of 5 knots and a series of concentric semicircle 23 spaced by the same intervals as the wind speed grid lines. It also has base lines or curves 24 for different air speeds, for the purpose set forth below, from which the corrections in knots for ground speed may be determined from the air speed and wind direction by rotating one of the straight-edges 6 or 7 around the circumferential degree scale 21 to a value representing the relative direction of wind to track, and reading the distance from the proper base line 24 to the intersection of the straight-edge with the wind speed circle 23 representing the wind speed. This speed correction in knots is applied to the air speed to get the ground speed.

Thus the pilot does not have to know much about navigation, but has merely to operate the disc 4 by holding the device in one hand and turning the disc with the thumb, to line up the straight-edges consecutively: first one straight-edge 6 to determine the correction for a 10 knot wind relative 90°, multiplying this value by the ratio of the actual wind velocity to 10 knots so as to get the correction for the actual wind relative 90°. It is seldom that the wind is exactly 90° off the track. Thus the pilot then moves the disc 4 so as to line up the other straight-edge 7 with the corresponding relative direction of the wind value on scale 18 to get the relative wind correction in per cent. of the correction which he found for the wind relative 90°. This will give him the actual correction that he must apply to the compass heading of the aircraft to maintain the track.

In theory, it can be shown that, for a wind velocity of 10 knots relative 90° to the desired course, the heading of the craft must be corrected relative to the course by an angle whose sine is equal to the ratio of 10 to the value of the air speed of the craft. This is the step performed in lining up straight-edge 6 with the value of the air speed on scale 15 and reading the value in degrees at the intersection of straight-edge 6 with curve 16.

It is understood, of course, that for a wind relative 90°, the correction angle obtained for wind velocities other than 10 knots is slightly in error, since the calculation is based on the premise that the sine of the angle is equal to the value of the angle for vary small angles. In other words, while the correction angle obtained for a 10 knot wind relative 90° is exact, the exact correction angle for a wind relative 90° of a different magnitude, say 5 knots, is not ½ of the correction angle for the 10 knot wind, as calculated by the apparatus of the present invention, but is equal to the angle whose sine is the ratio of 5 to the air speed. However, within the range of air speeds and wind speeds generally encountered in flight, this error is negligible, and the correc ion angle calculated according to the present invention is valid.

A similar assumption is utilized in calculating the correction angles for winds from directions other than 90° to the desired course, since the exact correction angle for such winds would be the angle whose sine is equal to the sine of the correction angle for a wind relative 90° times the sine of the actual angle of the wind relative to the course, while the calculated value according to the present invention is the correction angle for a wind relative 90° times the sine of the actual angle of the wind. However, within the ranges encountered, as stated above, the calculated value is substantially exact.

In order to determine his ground speed he will merely have to line up one of the straight-edges 6 or 7 over the right hand chart with the wind direction in degrees to port or starboard of his course on scale 21 and follow the semicircle 23 corresponding to the wind speed to its intersection with the straight-edge and then measure the vertical distance between this point of intersection to the base line 24 corresponding to the true air speed, interpolating if necessary. This distance, measured in knots along the grid lines 22, gives him the correction to apply to his air speed to determine the ground speed.

In calculating the ground speed, assuming that the angle between the course and the actual heading is small, it can be shown that the ground speed is equal to the air speed plus or minus the wind speed times the cosine of the angle between the wind and the course, depending upon the direction of the wind. It is this latter quantity which is measured by the operation on scales 21 and 23, the vertical distance between the point of intersection and the 90° grid line 22 representing the quantity wind speed times the cosine of the angle between the wind and the course.

The actual value of the first term of the equation for the ground speed is the air speed times the cosine of the angle of correction. In order to account for the cosine factor, base lines 24 are drawn, lines 24 being a plot of the value of the air speed times the quantity 1—the cosine of the angle whose sine equals the ratio of the wind speed to the air speed. In this manner, a more exact value of the magnitude of the ground speed is obtained.

It may be readily seen that a pilot does not have to know much about navigation to be able to solve these problems quickly and accurately by manipulation with only one hand. In addition, for record purposes he may enter the values of the course, the true heading, ground speed, the true air speed, the temperature, wind data at various altitudes, track, and other pertinent flight data, as indicated, in any convenient arrangement on the margin 12 of the sheet. The other side of the computer when folded, which may be called the back of the device, and which is hinged, as shown at 3, to the front sheet 1, comprises a similarly formed Plexiglas square 2 having a sanded surface and a right triangle-shaped Plexiglas sheet 25 slidably mounted by means of a slot 26 formed therein over a pin 27 in the center of the square, and extending perpendicularly to the hypotenuse 28 of the triangle. The slot 26 is terminated at the hypotenuse 28 by lug portion 29 which will accommodate the pin so that its center may be lined up with the hypotenuse when the triangle is moved so that the pin is in the end of the slot. The square sheet 2 has a compass rose 30 marked around the center of the pin and the triangle 25 is marked with a distance scale 31 along its hypotenuse and a series of spaced lines 32 parallel to the hypotenuse. This side of the device may be used in connection with maps, charts or photographs which may be placed under the square sheet and the scaled edge of the triangle may be used to measure off distances between points as e. g. the points 33 and 34 on the chart 35 while at the same time indicating the bearing of one point with respect to the other along the hypotenuse by reading the direction of the parallel lines closest to the center of the pin on the scale of the compass rose. A strip of the triangular surface along the hypotenuse edge may be sanded to facilitate placing pencil marks such as 36, 37 on the scale 31, representing the distance between points, so that the hypotenuse may be moved to a distance scale on the chart being used, for comparison therewith and determination of the actual distance between the points.

If desired, the two semicircular charts 13 and 14 used on the front sheet 1 of the device may also be etched on the surface of the rear sheet and the straight-edge scales 6 and 7 of the degrees correction for wind relative 90° and for percentage correction for wind from other directions, respectively, may be marked off on the hypotenuse 28 of the triangle in the two directions from the center, for use with the two semicircular charts in the same way as on the front of the device. This, however, is thought to be superfluous in most instances, although for special work it may be a desirable addition.

The back of the device is particularly useful for charting or laying off tracks over a map such as 35 placed between the Plexiglas sheets 1 and 2, and as the target is approached it may be used in connection with a target map, and later in connection with a photograph of the target replacing the map. Notations may be made on the sanded surface of the Plexiglas sheet 2 in this case, with reference to certain points on the map or photograph to assist in making a more accurate and complete report when the pilot returns to base.

The calculations performed by this embodiment of the present invention are also based upon the assumptions outlined above with respect to the embodiment of Fig. 1. However, it is pointed out again that, within the ranges of speeds encountered in flight, the errors introduced by these assumptions are negligible.

If desired, the device may be made by printing the numbers, tables and scales in luminous paint so as to make it possible for the computer to be used in night flying.

If a large tracking surface is desired, this device attached to a conventional plotting board will make the board a better tracking device. It eliminates the necessity for cluttering up the board with markings necessary to solving wind and ship vector problems. A further advantage of solving problems with the subject device is that of being able to deal with all speeds from 65 to 600 knots without having to depend on a large board for accuracy. A cross-country flyer who has his charts and this computer has all the navigation devices he needs.

When a problem involves ship movement, that is relative motion, the corrections pertaining to the ship's movement must be made first. The ship's movement is handled in the same manner as the air movement or wind. The correction of heading necessary to maintain a given course relative to the moving ship in no wind condition is determined first. Then the direction of the ship's travel relative to the plane's heading is determined and the speed of relative motion in a no wind condition is solved for. From this point on the heading correction necessary for wind and the correction necessary for determining the ground speed are determined in the manner described above. The algebraic sum of the corrections for ship movement and wind gives the correction necessary for maintaining a given course relative to a moving ship in the wind. The same is true for determining the actual speed of relative motion.

Various other modifications in form and arrangement of the several parts of these computers may be made without departing from the spirit and scope of this invention, as defined in the appended claims.

The invention described herein may be manufactured and used by or for the Government of the United States of America for governmental purposes without the payment of any royalties thereon or therefor.

What is claimed is:

1. A navigational computer comprising a rotatable disc having a clear window with two radial straight-edge scales marked thereon, said scales being calibrated in degrees and per cent, respectively, a base plate having a pair of semicircular charts under this window, one of which charts has inscribed thereon a circumferential linear scale of air speeds, another circumferential linear scale of degrees and a curve to be used in connection with one of the straight-edge scales on the rotatable disc for indicating on this straight-edge scale the number of degrees correction necessary for a predetermined wind velocity when this straight-edge scale is moved to the proper air speed on the air speed scale, another curve on this chart for use in connection with the other straight-edge scale to indicate on this scale the per cent of the above correction to be used for a wind which has a relative direction of the value to which this straight-edge scale is moved on the circumferential degree scale, the other of the semicircular charts comprising a graph for use in connection with either of the straight-edges to determine the amount of correction to be applied to the air speed in order to give the true ground speed, said other chart comprising a circumferential linear degree scale and a series of concentric semicircular lines calibrated in wind velocities and spaced at fixed intervals from the center of the last mentioned scale.

2. A navigational computer comprising a rotatable disc having a clear window with two radial straight-edge scales thereon, said scales being calibrated in degrees and percentage, respectively, a base plate having a pair of semicircular charts under this window, one of which charts has inscribed thereon a circumferential linear scale of air speed, another circumferential linear scale of degrees, a curve to be used in connection with one of the straight-edge scales on the rotatable disc for indicating on this straight-edge scale the number of degrees correction necessary for a predetermined wind velocity when this straight-edge scale is moved to the proper air speed on the air speed scale, and another curve for use in connection with the other straight-edge scale to indicate on this other scale the per cent of the correction to be used for a wind which has a relative direction of the value to which this other straight-edge scale is moved on the circumferential degree scale, the other of the semicircular charts comprising a graph for use in connection with either of the straight-edges to determine the amount of correction to be applied to the air speed in order to give the true ground speed, this second chart comprising a circumferential linear degree scale, a grid having vertical lines extending between fixed intervals on the upper and lower quarters of the circle and evenly spaced horizontal lines from the center of the circle indicating fixed intervals of wind speed, this graph further having a series of concentric semicircular lines spaced at intervals from the center of the circle equivalent to the fixed intervals between the horizontal lines and further having a series of base line curves for different air speeds.

3. A navigation computer comprising a rotatable disc having a clear window with two radial straight-edge scales marked thereon, said scales being calibrated in degrees and percentage, respectively, a base plate having a semicircular chart under said window, said chart having inscribed thereon a circumferential linear scale of air speed, another circumferential linear scale of degrees and a curve to be used in connection with one of the straight-edge scales on the rotatable disc for indicating on said one straight-edge scale the number of degrees correction necessary for a predetermined wind velocity when said one straight-edge scale is moved to the proper air speed on the air speed scale, another curve on said chart for use in connection with the other straight-edge scale to indicate on said other scale the per cent of the above correction to be used for a wind which has a relative direction of the value to which said other straight-edge scale is moved on the circumferential degree scale.

4. In a navigation computer for determining the ground speed and heading of an aircraft, the combination comprising: a rotatable disc having a clear window with a pair of radial straight-edge scales marked thereon, said scales being calibrated in degrees and percentage, respectively; a base plate supporting said disc and having a circular air speed scale and a circular degree scale marked thereon, said circular scales being positioned under said window; a curve on said plate for use with one of said straight-edge scales for indicating on said one straight-edge scale the number of degrees correction necessary for a predetermined wind velocity when said one straight-edge scale is moved to the proper air speed on said air speed scale; and another curve on said plate for use with the other straight-edge scale to indicate on said other scale the percent of said correction to be used for a wind having a relative direction of the value to which said other scale is moved on said degree scale.

5. In a navigation computer for determining the ground speed and heading of an aircraft, the combination comprising: a base plate; a member rotatably mounted on said plate, at least a portion of said member being transparent and having a radial straight-edge marked thereon; a series of concentric circular lines on said plate; one of said lines being linearly calibrated in degrees; the others of said lines being spaced at fixed intervals from each other and calibrated in wind velocities; and a series of base line curves for different air speeds on said plate.

6. In a navigation computer for determining the ground speed and heading of an aircraft, the combination comprising: a base plate; a member rotatably mounted on said plate, at least a portion of said member being transparent and having a pair of radial straight-edge scales marked thereon; a pair of circular scales on said plate below said portion, said circular scales being calibrated in air speed and degrees of relative wind direction, respectively; a first curve on said plate for use with said air speed scale and one of said radial scales, said curve representing the number of degrees of heading correction necessary for a predetermined wind velocity at any selected air speed; and a second curve on said plate for use with said degrees scale and the other of said radial scales, said second curve representing the percent of said correction necessary for any selected relative wind direction.

7. In a navigation computer, the combination comprising: a pair of relatively movable members; a pair of circular scales on one of said members calibrated in air speed and degrees of relative wind direction, respectively; a pair of straight-edge scales on the other of said members calibrated in degrees and percentage, respectively; a first curve on said one member for use with one of each of said pairs of scales for determining the number of degrees of heading correction necessary for a predetermined wind velocity at any selected air speed; and a second curve on said one member for use with the other of each of said pairs of scales for determining the percent of said correction necessary for any selected relative wind direction.

8. The combination according to claim 7, and a series of concentric circular lines on said one member, one of said lines being calibrated in degrees and the others of said lines being spaced at fixed intervals from each other and calibrated in wind velocities; and a series of base line curves for different air speeds on said member, both of said series being usable together with one of said straight-edge scales for determining the correction to be applied to the air speed to give the true ground speed.

MILLARD C. THRASH.

REFERENCES CITED

The following references are of record in the file of this patent:

UNITED STATES PATENTS

| Number | Name | Date |
|---|---|---|
| 378,257 | Leschorn | Feb. 21, 1888 |
| 1,133,540 | Dannenberg | Mar. 30, 1915 |
| 1,401,380 | Vaughan | Dec. 27, 1921 |
| 1,699,558 | Ainsworth et al. | Jan. 22, 1929 |
| 1,901,880 | Shuster | Mar. 21, 1933 |
| 1,984,390 | Wright | Dec. 18, 1934 |
| 2,019.708 | Jones | Nov. 5, 1935 |
| 2,247,531 | Thurston et al. | July 1, 1941 |
| 2,339,222 | Hokanson | Jan. 11, 1944 |
| 2,342,674 | Kotcher | Feb. 29, 1944 |
| 2,345,020 | Warner | Mar. 28, 1944 |
| 2,350,424 | Smith | June 6, 1944 |
| 2,425,097 | Isom | Aug. 5, 1947 |